United States Patent [19]
Campbell

[11] 3,711,116
[45] Jan. 16, 1973

[54] ANTI-SKID ATTACHMENT FOR AUTOMOBILES

[76] Inventor: Edward G. Campbell, 630 Dianne Drive, Melbourne, Fla. 32935

[22] Filed: July 27, 1971

[21] Appl. No.: 166,403

[52] U.S. Cl. .................. 280/150 C, 280/150 A
[51] Int. Cl. .............................. B60r 27/00
[58] Field of Search ............. 280/150 C, 150 A

[56] References Cited

UNITED STATES PATENTS

| 3,523,697 | 8/1970 | O'Sullivan | 280/150 A |
| 3,415,537 | 10/1968 | Goggins | 280/150 C |
| 2,625,417 | 1/1953 | Sundheim | 280/150 C |

FOREIGN PATENTS OR APPLICATIONS 876,653   5/1953   Germany .................. 280/150 C

*Primary Examiner*—Benjamin Hersh
*Assistant Examiner*—Robert R. Song
*Attorney*—Alexander B. Blair et al.

[57] ABSTRACT

An anti-skid attachment for automobiles in which a ground engaging anti-skid wheel is driven through a gear box from a power engaging wheel with the anti-skid attachment being movable into and out of operation by a hydraulically actuated cylinder. The anti-skid attachment may be attached and detached by hand without the use of tools.

5 Claims, 8 Drawing Figures

INVENTOR.
EDWARD G. CAMPBELL
BY Victor J. Evans & Co.
ATTORNEYS.

INVENTOR.
EDWARD G. CAMPBELL
BY Victor J. Evans &co.
ATTORNEYS.

3,711,116

ANTI-SKID ATTACHMENT FOR AUTOMOBILES

BACKGROUND OF THE INVENTION

Field of the Invention

The present invention relates to traction incresing anti-skid devices for motor vehicles.

Summary of the Invention

A ground engaging anti-skid wheel is mounted on a gear box and is driven through the gear box by a tire engaging wheel also mounted on the gear box. The wheels and the gear box are detachably mounted in a trackway for movement to and from operative position. A hydraulic cylinder actuated from the power steering unit or other source of hydraulic fluid moves the anti-skid unit into its operative position.

The primary object of the invention is to provide an anti-skid attachment for motor vehicles which can be attached and detached without tools and which can be moved into operative position by remotely controlled power means.

Other objects and advantages will become apparent in the following specification when considered in light of the attached drawings.

DESCRIPTION OF THE PREFERRED EMBODIMENT

Figure 4:
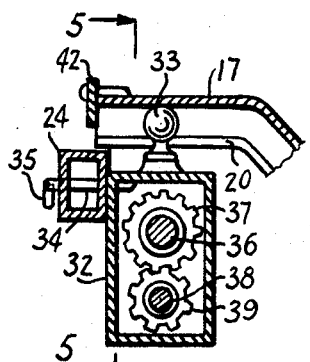
FIG. 4 is an enlarged fragmentary vertical sectional view taken along the line 4—4 of FIG. 3 looking in the direction of the arrows.
Figure 1:
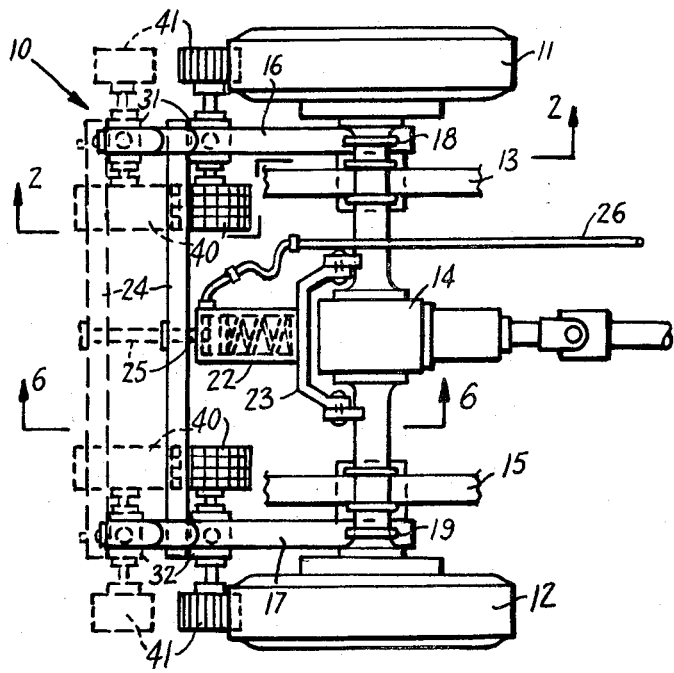
FIG. 1 is a top plan view of the invention with parts of the motor vehicle broken away for convenience of illustration.
Figure 5:
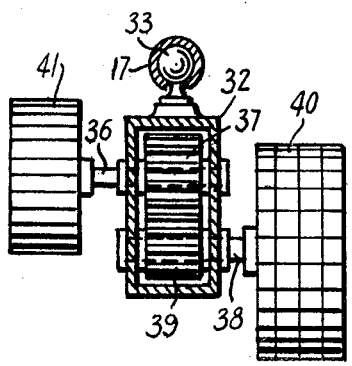
FIG. 5 is a transverse sectional view taken along the line 5—5 of FIG. 4 looking in direction of the arrows.
Figure 2:
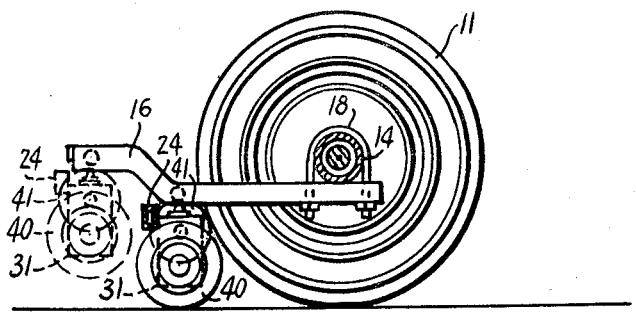
FIG. 2 is a vertical sectional view taken along the line 2—2 of FIG. 1 looking in the direction of the arrows.
Figure 6:
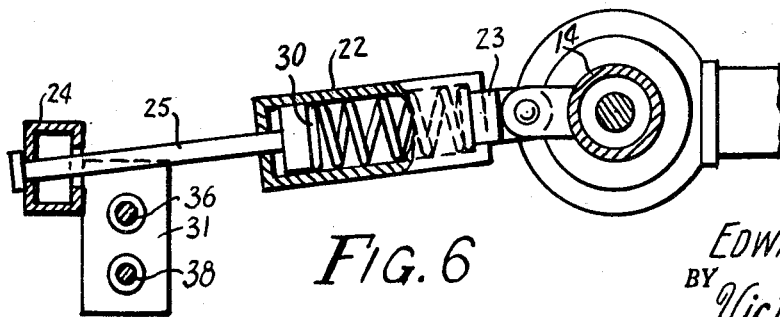
FIG. 6 is an enlarged fragmentary vertical sectional view taken along the line 6—6 of FIG. 1 looking in the direction of the arrows.
Figure 3:
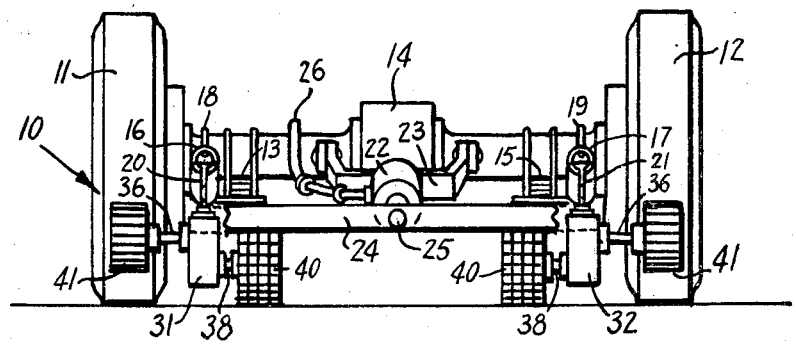
FIG. 3 is a rear elevation of the invention with parts of the motor vehicle broken away for convenience of illustration.
Figure 7:
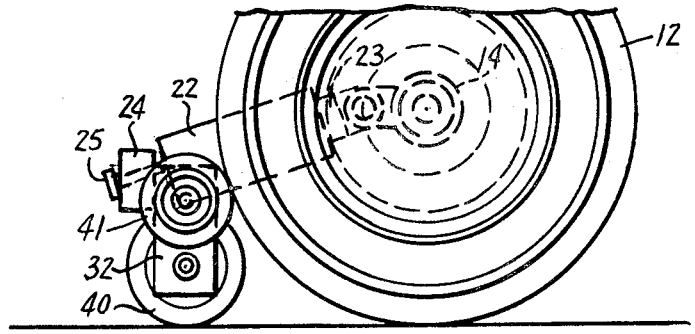
FIG. 7 is a side elevation of the invention with parts of the motor vehicle broken away for convenience of illustration.
Figure 8:
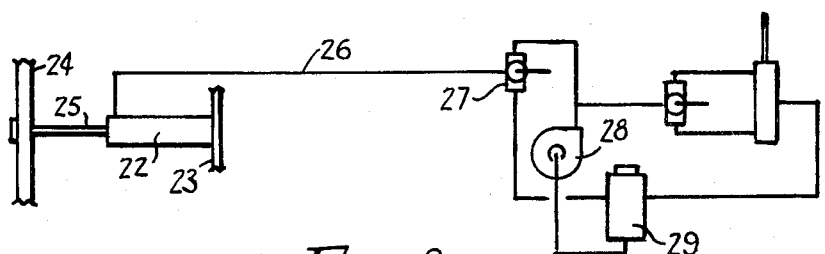
FIG. 8 is a semi-diagrammatic illustration of the hydraulic circuit used with the present invention.

Referring now to the drawings in detail where like reference characters indicate like parts throughout the several figures the reference numeral 10 indicates generally an anti-skid attachment for motor vehicles constructed in accordance with the invention.

The anti-skid attachment 10 is adapted for use with a motor vehicle of the type which includes a pair of rear wheels 11, 12 supported on and driven by a rear axle unit 14 which carries springs 13, 15 thereon in the conventional manner.

The anti-skid attachment includes a pair of elongate pipe members 16, 17 secured to opposite ends of the axle unit 14 by means of U-bolts 18, 19.

The pipe members 16, 17 extend rearwardly from the axle 14 and have an upwardly and rearwardly sloping offset intermediate their ends. The pipe members 16, 17 are longitudinally slotted at 20, 21 at the rear thereof and through the offset portions thereof.

A hydraulic cylinder 22 is pivotally connected to the axle unit 14 on a yoke 23 with the cylinder 22 extending rearwardly. A transverse bar 24 extends completely across the vehicle parallel to the axis unit 14 and has a piston rod 25 extending therethrough to move the bar forwardly and rearwardly as the hydraulic cylinder 22 is actuated.

A hydraulic line 26 extends forwardly from the hydraulic cylinder 22 to a hand control valve 27. A power steering pump 28 is connected to the valve 27 and to a reservoir 29 to permit fluid from the pump 28 to be either directed to the cylinder 22 or to the reservoir 29. A spring 30 in the hydraulic cylinder 22 normally urges the piston rod 25 rearwardly to retract the bar 24 from its operating positions.

A pair of gear boxes 31, 32 are provided for association with opposite sides of the motor vehicle. Each of the gear boxes 31, 32 is mounted on a ball 33 which is adapted to slide within the pipes 16, 17 extending downwardly through the slots 20, 21. A pin 34 extends rearwardly from each of the gear boxes 31, 32 through a bore in the opposite ends of the bar 24 and is secured therein by a gravity latch 35.

A shaft 36 is journalled in the gear box 31, 32 and has a spur gear 37 secured thereto within the gear box 31, 32. A second shaft 38 is similarly journalled in the gear boxes 31, 32 and has a spur gear 39 secured thereto within the gear boxes 31, 32. A ground engaging anti-skid wheel 40 is mounted on the shaft 38 and a tire engaging wheel 41 is secured to the outer end of the shaft 36.

A pivoted gravity latch 42 is secured to the rear end of each of the pipe members 16, 17 to prevent the ball 33 from becoming disengaged therefrom.

In the use and operation of the invention gear boxes 31, 32 and their attached wheels 40, 41 are normally carried in the trunk of the vehicle completely out of sight. Upon encountering conditions which indicate that skidding or loss of traction is probable the gear boxes 31, 32 with their attached wheels 40, 41 are removed from the trunk and the latches 42 are raised and the ball 33 is inserted into the pipes 16, 17. The bar 24 is then moved onto the pins 34 and the device is ready for use. In order to bring the wheels 40 into engagement with the ground pressure through the line 26 forces the piston rod 25 of the hydraulic cylinder 22 forwardly moving the bar 24 forwardly to slide the balls 33 in the pipes 16, 17 forwardly and down through the offset portion so that the wheel 40 comes in contact with the ground and the wheel 41 comes in contact with the wheels 11, 12 of the motor vehicle. The ratio of the gears 37, 39 is such that the ground speed of the wheels 40 is identical to the ground speed of the wheels 11, 12.

Having thus described the preferred embodiment of the invention it should be understood that numerous structural modifications and adaptations may be resorted to without departing from the spirit of the invention.

I claim:

1. An anti-skid attachment for motor vehicles of the type having a rear axle unit, and a pair of ground engaging wheels mounted on opposite ends of said axle unit comprising a pair of track members extending rearwardly from said axle unit perpendicularly thereto, a gear box detachably mounted for sliding movement in each of said track members, a ground engaging antiskid wheel mounted on each of said gear boxes to be driven thereby, a vehicle wheel engaging wheel mounted on each of said gear boxes for driving said ground engaging wheel through said gear box, and power means for moving said gear boxes forwardly and downwardly along said tracks to engage said ground engaging wheels with the ground and said wheel engaging wheels with the wheels.

2. A device as claimed in claim 1 wherein said track members comprise hollow tubular members having a longitudinal slot formed in the underside thereof.

3. A device as claimed in claim 2 wherein each of said gear boxes is mounted on a ball with said ball adapted for sliding mounting in said tubular members.

4. A device as claimed in claim 1 wherein a transverse bar is detachably connected to each of said gear boxes at the opposite ends of said bar and the means for moving said gear boxes along said track is connected centrally to said bar.

5. A device as claimed in claim 4 wherein the means for moving said gear boxes along said track includes a hydraulic cylinder, a hydraulic line connecting one end of said cylinder to a source of hydraulic fluid under pressure, for moving said bar in a direction to engage said ground engaging wheels with the ground.

* * * * *